[11] 3,617,928

[72] Inventor George F. Hausmann
  Glastonbury, Conn.
[21] Appl. No. 731,658
[22] Filed May 23, 1968
[45] Patented Nov. 2, 1971
[73] Assignee United Aircraft Corporation
  East Hartford, Conn.

[54] AERODYNAMIC WINDOW FOR GAS DYNAMIC LASER
  5 Claims, 2 Drawing Figs.
[52] U.S. Cl..................................................... 331/94.5,
  350/319
[51] Int. Cl..................................................... H01s 3/05
[50] Field of Search........................................... 331/94.5

[56] References Cited
OTHER REFERENCES

Gerry and Rose, " Combinded Anode-Cathode Feed of a Hollow-Cathode Arc," Journal of Applied Physics, vol. 37, #7, June 66. Pg. 2725.

Gordon and Miller, " Continuous-Duty Argon Ion Laser," Journal of Quantum Electronics, vol. 1, #6, Sept. 65, pg. 273.

Primary Examiner—Rodney D. Bennett, Jr.
Assistant Examiner—J. M. Potenza
Attorney—Jack N. McCarthy ABSTRACT: A gas dynamic laser emits an output beam from a low-pressure region downstream of a nozzle section through which gases are expanded which contain the constituents necessary to obtain a lasing action. A gas dynamic laser employs the principles of kinetic relaxation of excited states of specific gas species to effect a population inversion of the excited states to obtain lasing action. An oscillator directs a low beam into said low-pressure lasing region, and through an optic arrangement the beam is amplified and directed out of an opening in the gas dynamic laser. Under normal circumstances the provision of such an opening would incur a flow of air from the ambient pressure to the low pressure within the laser cavity. The opening is connected to an aerodynamic window. The window has a passage leading from the low-pressure region of the gas dynamic laser in which pressures are set up permitting passage of the laser beam with no physical obstruction, yet prevent or minimize the flow of ambient air into the cavity.

INVENTOR
GEORGE F. HAUSMANN
BY Jack N. McCarthy
AGENT

AERODYNAMIC WINDOW FOR GAS DYNAMIC LASER

BACKGROUND OF THE INVENTION

This invention relates to aerodynamic windows and particularly for gas dynamic lasers. In lasers of low power, windows with physical walls made of materials which transmit the laser wavelength have been used, but subject window is for use when the laser beam will disintegrate physical window materials.

SUMMARY OF THE INVENTION

A primary object of this invention is to provide a window which would permit passage of a laser beam with no physical obstructions, yet prevent or minimize the flow of ambient air into the cavity.

In accordance with the present invention a window can be used which is adaptable to a series-type arrangement where it is possible to reduce the total pump requirements for a given laser.

DESCRIPTION OF THE PREFERRED EMBODIMENT

Figure 1:
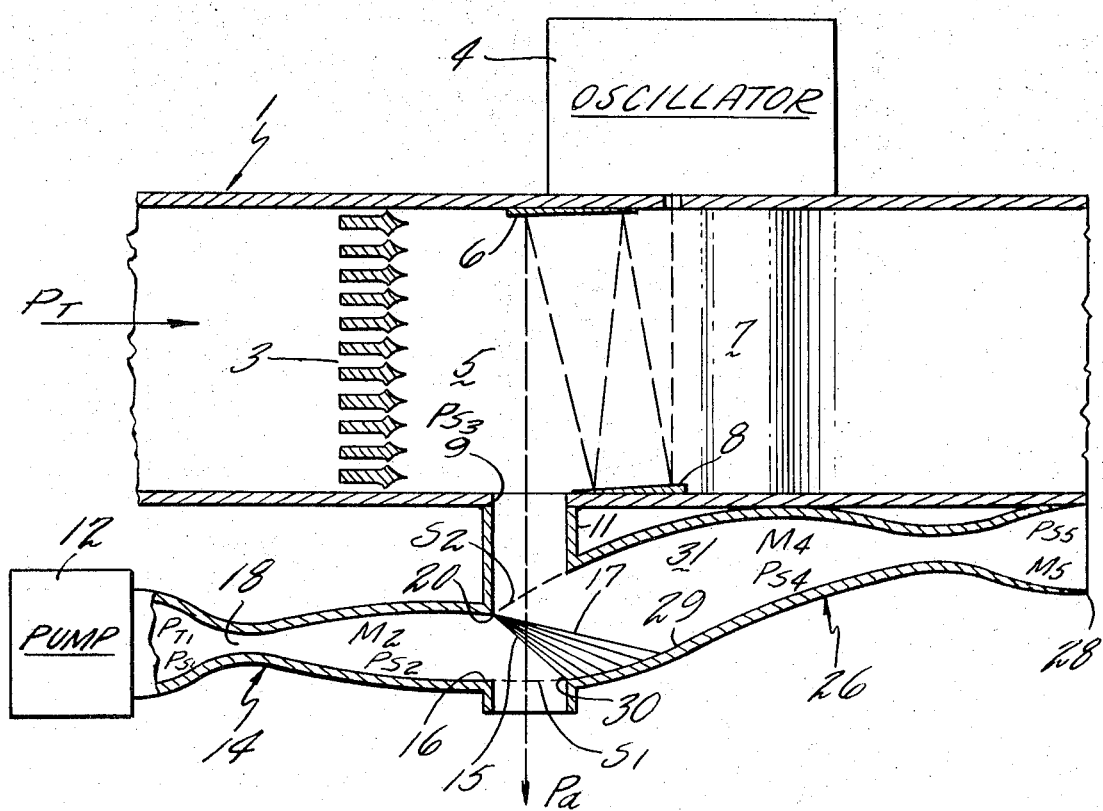
FIG. 1 is a view showing the use of a laser beam with an aerodynamic window in accordance with the present invention.

A gas dynamic laser 1 comprises a nozzle 3, a laser cavity 5 and a diffuser 7. The laser beam formed in the cavity 5 is directed through an opening 9 in the side of the laser. An oscillator 4 directs a laser beam into said laser cavity 5 and the beam is amplified between the mirror 6 and 8 to produce the output beam. A passage 11 extends downwardly from and around the opening 9 through which the output beam passes from the cavity. To provide an aerodynamic boundary so that the difference in pressure between $p_a$ and $p_{s3}$ is prevented from equalizing, a pump 12 is used to provide a high-pressure gas which is then expanded through a Laval nozzle 14 which has its exit 16 opening into said passage 11. This provides a uniform supersonic flow where the nozzle 14 intersects the passage 11. The Mach Number at this point is supersonic and the static pressure is adjusted to be exactly equal to the ambient static pressure, $P_a$. The Mach Number and static pressure at the exit 16 of the nozzle 14 are adjusted by the expansion ratio of the nozzle, that is the ratio of the area at the exit to the area at the throat 18, and the total pressure output of the pump 12.

A corner or edge 20 is provided to allow the supersonic flow with Mach Number $M_2$ to expand through a Prandtl-Meyer expansion fan such that the Mach Number downstream of the expansion, $M_4$, is increased and the static pressure, $P_{s4}$, is equal to the pressure, $P_{s3}$, in the laser cavity 5. It is thus seen that the stream lines $S_1$ and $S_2$ describe pressure boundaries which are equal to the ambient pressure, $P_a$, and the pressure in the laser cavity, $P_{s3}$, respectively, thus forming a passage with no physical boundaries which sustains the pressure difference, $P_a-P_{s3}$, with no leakage from the atmosphere to the cavity 5.

In order to minimize the power requirements of pump 12, a supersonic diffuser 26 is provided to reduce the supersonic exit velocity to a low subsonic velocity at position 28, thereby minimizing total pressure losses. The flow at position 28 may be either exhausted to the atmosphere or may be recirculated to the inlet of pump 12. In order to minimize pump power requirements, it is desirable to have a low-weight flow of gas with as low a total pressure as possible to the Laval nozzle 14. The total pressure and airflow requirements may be optimized, or minimized, from a consideration of the pressure ratio which must be sustained across the aerodynamic window and the area of the aerodynamic window, which is dictated by the size of the laser beam. From aerodynamic characteristics of Prandtl-Meyer expansion flows it is apparent that the ratio of the area of the window at streamline $S_1$ relative to the area of the Laval nozzle exit 16 is a function of the flow Mach Number at the exit. The first expansion wave 15 is a function of $M_2$ and its intercept with wall 29 must occur downstream of the corner 30, in order for the pressure across streamline $S_1$ to remain at the atmospheric value. Therefore, the size of the Laval nozzle and the corresponding flow from the pump is dictated by the size of the window at $S_1$, and $M_2$. The last wave 17 of the expansion fan is dictated by the pressure in the laser cavity, $P_{s3}$. This pressure and the corresponding turning of the flow prescribed a discrete Mach Number $M_4$ in duct 31 of the diffuser 26. In order to further minimize pump pressure requirements, it is desirable that $M_4$ be as low as possible so that the total pressure losses in diffuser 26 are minimized. It is thus apparent that pump flow and pressure requirements for a given laser cavity pressure and laser beams orifice size may be optimized by standard compressible flow calculations.

Figure 2:
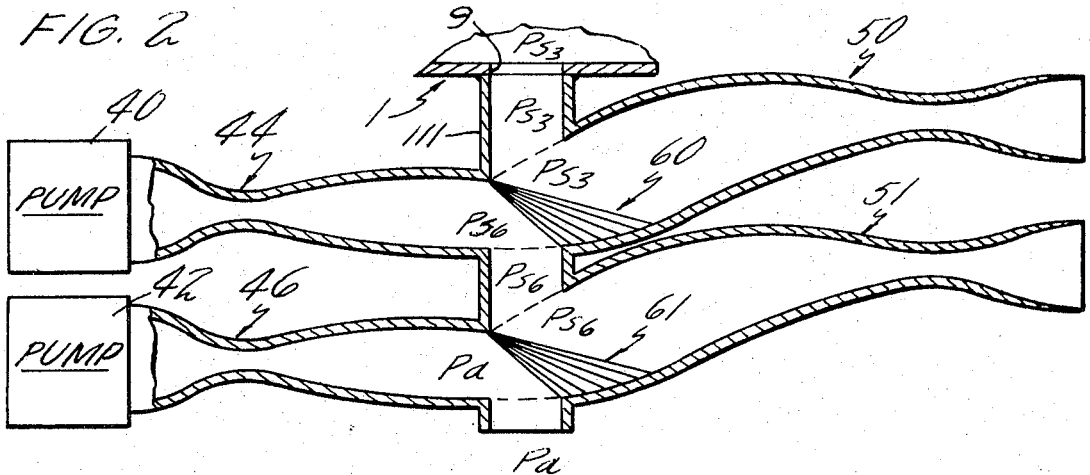
FIG. 2 is a view showing the use of two windows to reduce the pumping requirement for a given laser.

In FIG. 2 a series window arrangement is set forth which provides further optimization. Two pumps 40 and 42 are placed together to provide a high-pressure gas which is then expanded through Laval nozzles 44 and 46, respectively. Each nozzle has its exit opening into passage 111 in the same manner as FIG. 1. Diffusers 50 and 51 are provided for the flow from nozzles 44 and 46 respectively.

In this application, the static pressure ratio and flow requirements of the exits of nozzles 44 and 46 are reduced over that of the single nozzle as shown in FIG. 1, and it is possible for the total pump requirements for a given laser to be reduced over the pump requirements for a single nozzle application.

The regions of pressure formed by the two nozzles in series is shown in FIG. 2 by the representations $P_{s3}$, $P_{s6}$, and $P_a$. The Prandtl-Meyer expansion fans formed are shown by 60 and 61.

It is to be understood that the invention is not limited to the specific description above or other specific figures, but may be used in other ways without departure from its spirit as defined by the following claims.

I claim:

1. In combination, a gas laser comprising a main duct, means providing a gas containing constituents necessary to obtain a lasing action, expansion means in said duct, a lasing region of low pressure downstream of said expansion means, oscillator means for directing a laser beam into said lasing region substantially transversely of the flow of said main duct, an entrance in said main duct for receiving said laser beam from said oscillator means, reflector means in said main duct thereby forming at least two reflected laser beam paths, an outlet in said main duct forming an exit for the reflected laser beam, and an auxiliary duct adjacent said exit forming a path running substantially transversely of said reflected beam, and means providing a supersonic flow through said auxiliary duct to form a predetermined pressure pattern across said exit and in the path of said reflected beam.

2. The combination as set forth in claim 1 wherein said auxiliary duct includes a Laval nozzle having its exit opening into said outlet, and said means providing a supersonic flow including a pump connected to the inlet of said Laval nozzle, said auxiliary duct including a diffuser located opposite the opening of said exit of the Laval nozzle to receive flow therefrom.

3. The combination as set forth in claim 2, wherein a Prandtl-Meyer expansion fan is formed at the edge made by the intersection of the exit of the Laval nozzle and the opening adjacent the main duct.

4. The combination as set forth in claim 1 wherein a second auxiliary duct is located downstream of said other auxiliary duct and forms a second path running substantially transversely of said reflected beam, means providing a supersonic flow through said second auxiliary duct to form a predetermined pressure pattern across said exit and in the path of said reflected beam.

5. The combination as set forth in claim 4 wherein both of said auxiliary ducts include Laval nozzles having exit openings into said outlet for forming Prandtl-Meyer expansion fans.

* * * * *